(12) United States Patent  (10) Patent No.: US 9,244,852 B2
Prasad  (45) Date of Patent: Jan. 26, 2016

(54) RECOVERING FROM UNCORRECTED MEMORY ERRORS

(71) Applicant: GLOBALFOUNDRIES INC., Grand Cayman (KY)

(72) Inventor: Aravinda Prasad, Banaglore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 152 days.

(21) Appl. No.: 13/887,632

(22) Filed: May 6, 2013

(65) Prior Publication Data

US 2014/0331015 A1 Nov. 6, 2014

(51) Int. Cl.
*G06F 12/08* (2006.01)
*G06F 12/12* (2006.01)

(52) U.S. Cl.
CPC .......... *G06F 12/0891* (2013.01); *G06F 12/126* (2013.01)

(58) Field of Classification Search
CPC . G06F 11/073; G06F 12/126; G06F 12/0891; G06F 11/00; G06F 12/08; G06F 12/023; G06F 12/0253
USPC .............................. 711/159; 714/15, 5, 6.13
See application file for complete search history.

(56) References Cited

U.S. PATENT DOCUMENTS

| 7,308,610 | B2 | 12/2007 | Kuramkote et al. |
| 7,533,303 | B2 * | 5/2009 | Zeighami et al. ............ 714/47.2 |
| 7,721,140 | B2 | 5/2010 | Dell et al. |
| 7,739,557 | B2 | 6/2010 | Brahmadathan et al. |
| 8,055,988 | B2 | 11/2011 | Lam |
| 2008/0052598 | A1 | 2/2008 | Aksamit et al. |
| 2009/0055680 | A1 * | 2/2009 | Honda et al. ...................... 714/5 |
| 2009/0282300 | A1 * | 11/2009 | Heyrman et al. ............. 714/708 |
| 2010/0318845 | A1 * | 12/2010 | Kohiga ............................ 714/15 |
| 2011/0145632 | A1 | 6/2011 | Waldspurger et al. |
| 2012/0137168 | A1 * | 5/2012 | Lu ............................... 714/6.13 |
| 2012/0151252 | A1 * | 6/2012 | Harris et al. ................. 714/6.13 |
| 2013/0111301 | A1 * | 5/2013 | Chu .............................. 714/766 |

FOREIGN PATENT DOCUMENTS

JP 10049448 A 2/1998

OTHER PUBLICATIONS

Bridges et al, "Cooperative Application/OS DRAM Fault Recovery", Department of Computer Science, Univ of New Mexico, Albuquerque and Sandia National Laboratories, Albuquerque, NM, pp. 1-10, URL:https://cfwebprod.sandia.gov/cfdocs/CCIM/docs/paper3.pdf.

(Continued)

*Primary Examiner* — Aimee Li
*Assistant Examiner* — Edmund Kwong
(74) *Attorney, Agent, or Firm* — DeLio, Peterson & Curcio; Kelly M. Nowak

(57) ABSTRACT

A method for recovering from uncorrected memory errors may include receiving, at an operating system, a correctable error (CE) associated with a first memory page. The correctable error is marked in a page table entry describing the first memory page. The first memory page is then migrated, by the operating system, to a second memory page based on the received correctable error.

5 Claims, 5 Drawing Sheets

(56) References Cited

OTHER PUBLICATIONS

Intel White Paper, "Intel Xeon Processor E7 Family: Reliability, Availability, and Serviceability, Advanced Data Integrity and Resiliency Support for Mission-Critical Deployments", pp. 1-15. URL:http://www.intel.com/content/dam/www/public/us/en/documents/white-papers/xeon-e7-family-ras-server-paper.pdf.

Milojicic et al., "Increasing Relevance of Memory Hardware Errors a Case for Recoverable Programming Models," ACM SIGOPS European workshop, 2000, pp. 97-102.

\* cited by examiner

RECOVERING FROM UNCORRECTED MEMORY ERRORS

FIELD

The present disclosure relates generally to the field of computer systems, and more particularly relates to correcting errors in computer memory.

BACKGROUND

Errors in computer memory are among the most common hardware causes of machine failures in the business enterprise production environment. An enterprise computer system may employ different mechanisms in the hardware, such as Error Correcting Codes (ECC), to attempt transparent recovery from memory errors. Errors that the hardware cannot correct eventually lead to hardware failures, which require identifying and replacing the affected memory modules. While the memory modules may be inexpensive relative to the total investment in the computer hardware configuration, the disruption to affected business applications and potential loss of data may be costly to remediate. Additionally, as advances in technology lead to increased density in memory chips, a corresponding increase in the rate of memory failures may also result.

It may therefore be desirable, among other things, to transparently correct errors detected in computer hardware memory more efficiently.

BRIEF SUMMARY

According to an aspect of the invention, a method for recovering from uncorrected memory errors comprises: receiving, at an operating system, a correctable error (CE) associated with a first memory page; marking the correctable error in a page table entry describing the first memory page; and migrating the first memory page, by the operating system, to a second memory page based on the received correctable error.

In another aspect of the invention, a method of recovering from uncorrected memory errors comprises: detecting, at an operating system, a corrected error associated with a first memory page; determining, by the operating system, a minimum page size supported by the operating system; and dividing the first memory page into a plurality of equally-sized second memory pages of a next lower page size supported by the operating system, based on the first memory page being larger than the minimum page size supported by the operating system.

According to another aspect of the invention, a computer program product for recovering from uncorrected memory errors, the computer program product including an operating system program embodied on a computer readable storage medium, the operating system program including code executable by a processor to perform a method comprising: receiving, at an operating system, an error associated with a first memory page; marking the error in a page table entry describing the first memory page; flushing the first memory page to non-transient storage; migrating the first memory page, by the operating system, to a second memory page; and re-fetching, by the operating system, a contents of the first memory page from non-transient storage.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
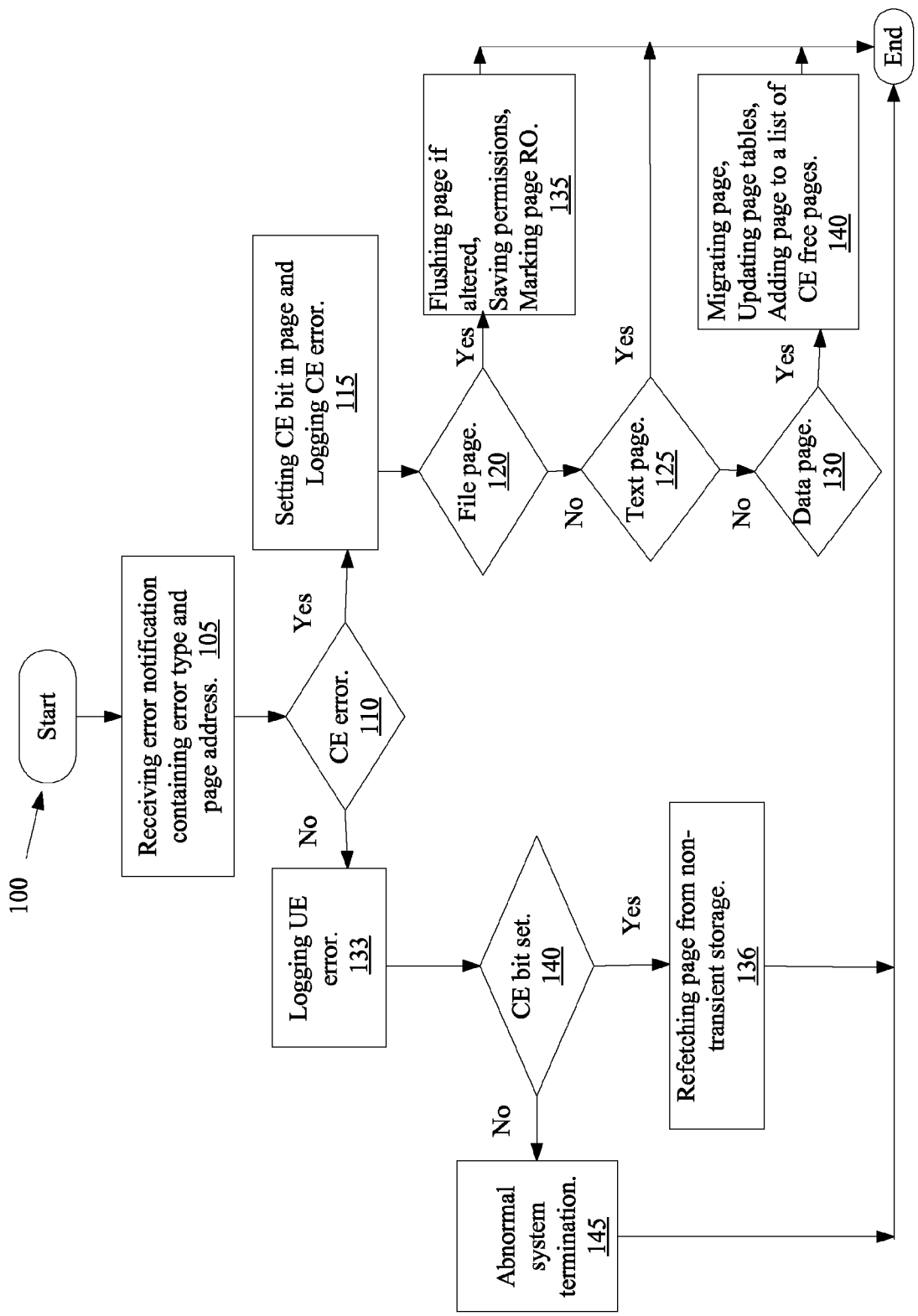
FIG. 1 is a flow chart illustrating a method of recovery from uncorrected memory errors according to one exemplary embodiment.

Embodiments of the present invention will now be described with reference to the figures. As used herein, the term "operating system" may refer to a set of supervisory routines for controlling the operating of a computing system, including one or more of the following major functions: task management, storage management, input/output management, and data management. The term "firmware" may refer to a plurality of program instructions that are stored in persistent memory on a hardware device such as, for example, firmware 838 (FIG. 5) associated with a network adapter or interface 836 (FIG. 5), and that control how the hardware device operates and communicates with other components in a computer system. The firmware cooperates with the operating system to manage and control the major functions of the computer system. As used herein, "firmware" and "operating system" are referred to collectively as the operating system (OS) since, especially in enterprise computer systems, their functions may be integrated such that they operate as a single entity.

A computer system, for example 400 (FIG. 5), implements well known virtual addressing mechanisms that allow each of the programs of a computer system to behave as if they have access to at least as much main memory, for example 822 and 824 (FIG. 5), as is physically present in the computer. When describing main memory, the term "page frame," also called a "physical page," may refer to a fixed-length constituent of computer hardware memory, the size of which, for example 4 kilobytes (KB), depends on the hardware architecture. The OS assigns a physical address to each physical page. When a page frame is allocated to a program, the OS memory management component assigns the page frame an address that is within the program's addressable range of memory addresses, called the address space. The page frame may then be referred to as a having a "virtual address" and being a "virtual page" in addition to having the physical address. Those skilled in the art will recognize that when using virtual addressing, application programs, data, and the OS are not necessarily all completely resident in main memory at the same time. Therefore, the term "memory page" may refer to the physical page, or the associated virtual page, depending upon the context of the reference. As used herein, a "memory page" refers to the physical page, unless the distinction is made.

As part of implementing virtual addressing mechanisms, the hardware and the OS may cooperate to utilize a plurality of registers, page tables and/or descriptors to manage the physical pages and associated virtual pages. This management includes creating an address space, which represents a range of virtual memory addresses that a program may address, allocating the page frames to the address space, translating the page frame addresses to virtual addresses, and updating the plurality of registers, page tables and/or descriptors to reflect the page allocations. The location, contents and function of registers, descriptors and page tables may vary according to the hardware and/or OS implementation. Various parameters associated with each page frame include, among other things, an address (e.g., virtual or physical address) and binary digit (bit) indicators of status, page type (e.g., text, data, etc.), and access permissions.

The term "file page" may refer to a memory page that contains data that have been mapped into memory from a file that resides on non-transient storage, such as a disk. As referenced herein, the term "data page" may include memory pages containing initialized variables that have been mapped into memory from a data segment within an executable program file that resides on non-transient storage, such as disk, as well as memory pages that are dynamically allocated. As used herein, the term "text page" may include memory pages containing executable program instructions that have been mapped into memory from a text segment within an executable program file that resides on non-transient storage, such as disk.

Figure 5:
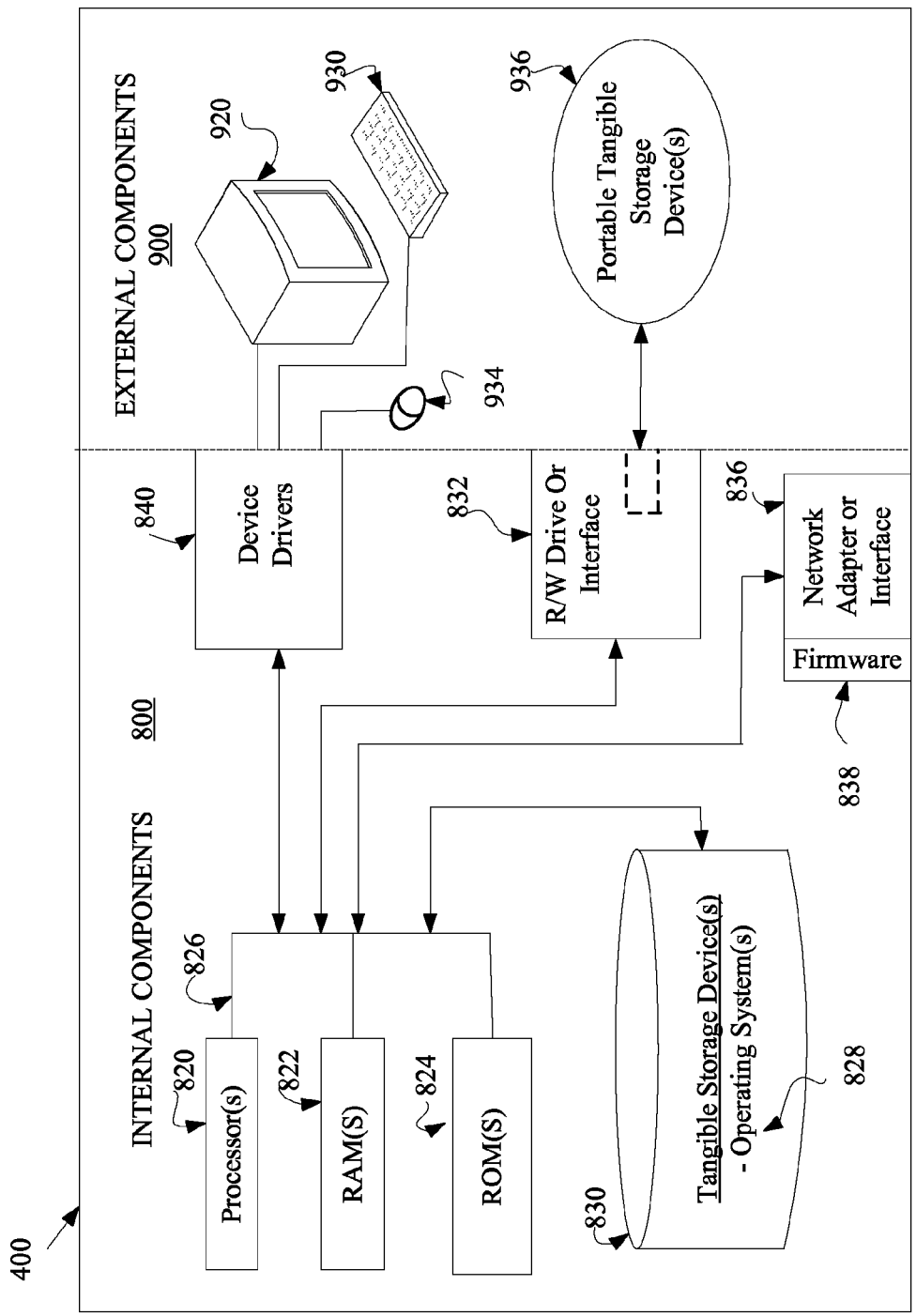
FIG. 5 is a block diagram of hardware and software according to one exemplary embodiment.

Referring to FIG. 1, a method 100 according to an embodiment of the present invention provides recovery from uncorrected memory errors using program instructions embodied in, for example, an operating system 828 (FIG. 5) and/or firmware 838 (FIG. 5). At 105, the OS receives an interrupt, which may be indicative of receiving an error notification. The OS may contain an architecture-dependent layer within the kernel to integrate the OS with the hardware platform on which it runs, thereby enabling the OS to implement and exploit several hardware architectures. In a computer system, an interrupt is an event that may alter the sequence in which the processor executes program instructions, depending on the circumstances of the event. Parameters accompanying the interrupt may be available to the OS in a plurality of hardware registers and memory locations that the OS uses to uniquely identify the interrupt. The parameters may include an error code, a memory address where the error occurred, and a memory address that represents the start of a specialized software routine, referred to as a First Level Interrupt Handler (FLIH), which the OS invokes to process the error.

At 110, the OS, through parameters included in the FLIH, identifies the interrupt event from 105 as a soft memory error, also referred to as a Corrected Error (CE). A CE may result from randomly corrupted bits on a memory page that the hardware may detect and repair using various Error Correcting Codes (ECC), such as for example, parity bits, checksums, or other algorithms.

At 115, if a CE is detected (110), the OS may create an entry corresponding to the CE in an event log that may be used for diagnosis and analysis by, for example, a computer hardware technician. The OS uses the memory address supplied by the FLIH to identify the memory page having the CE. A status bit may be set, for example, a CE_ENCOUNTERED bit, in one or more page table entries describing a memory page, which indicates that a CE was encountered on the physical page.

At 120, when the memory page is identified as a file page, at 135 if the copy of the page in memory is more current than the one on non-transient storage, the copy in memory is written, also known as flushed, to the non-transient storage. The original memory page access permissions are saved in the one or more page table entries describing the memory page, and the memory page is marked as read-only to allow the operating system to migrate the memory page to a different page frame as a background process. At 125, for a text page, no further action is taken since the contents of a text page are static, and may be reloaded from non-transient storage, such as a disk, at any time. At 130, when the memory page is identified as a data page, at 140 the OS allocates a replacement memory page that has not previously encountered a CE, as determined by, for example, the status of a CE_ENCOUNTERED bit. The OS copies the contents of the original memory page to the replacement memory page. The page table entries corresponding to the memory pages within the program's address space are updated to remove the address of the original memory page and to add the address of the replacement memory page. The original memory page is added to a queue of memory pages such as, for example, a CE_FREE_PAGES queue, from which the OS may make future memory page allocations. Thus, an active program may continue to execute, since the migration between the original memory page and the replacement memory page occurred transparently.

However, hardware may not be able to correct all memory errors successfully. This may occur with hard errors, also referred to as Uncorrected Errors (UE), which may result when the number of affected bits exceeds the limit or ability of the ECC and which usually result in hardware failures. At 110, the OS uses the error code and memory address supplied by the FLIH to identify that a UE was detected on the memory page. At 133, the OS processes the error by creating an entry corresponding to the UE in its event log that may be available for later diagnosis and analysis. At 140, the OS queries the status bit corresponding to the memory page to verify whether the memory page previously encountered a CE. Where CE status is not verified via the status bit, the OS terminates abnormally at 145, since it is unexpected that a UE will be presented to the OS without an accompanying CE, and continued processing may corrupt critical data. However, where the CE status is verified via the status bit, indicating a prior CE occurrence on the memory page, at 136 the contents of the memory page are discarded and may be refreshed by re-fetching such contents from non-transient storage, such as disk, using standard OS data management routines. Thus, memory pages having previously encountered a CE may recover from UE errors, where previously these errors resulted in unrecoverable hardware failures.

Figure 2:
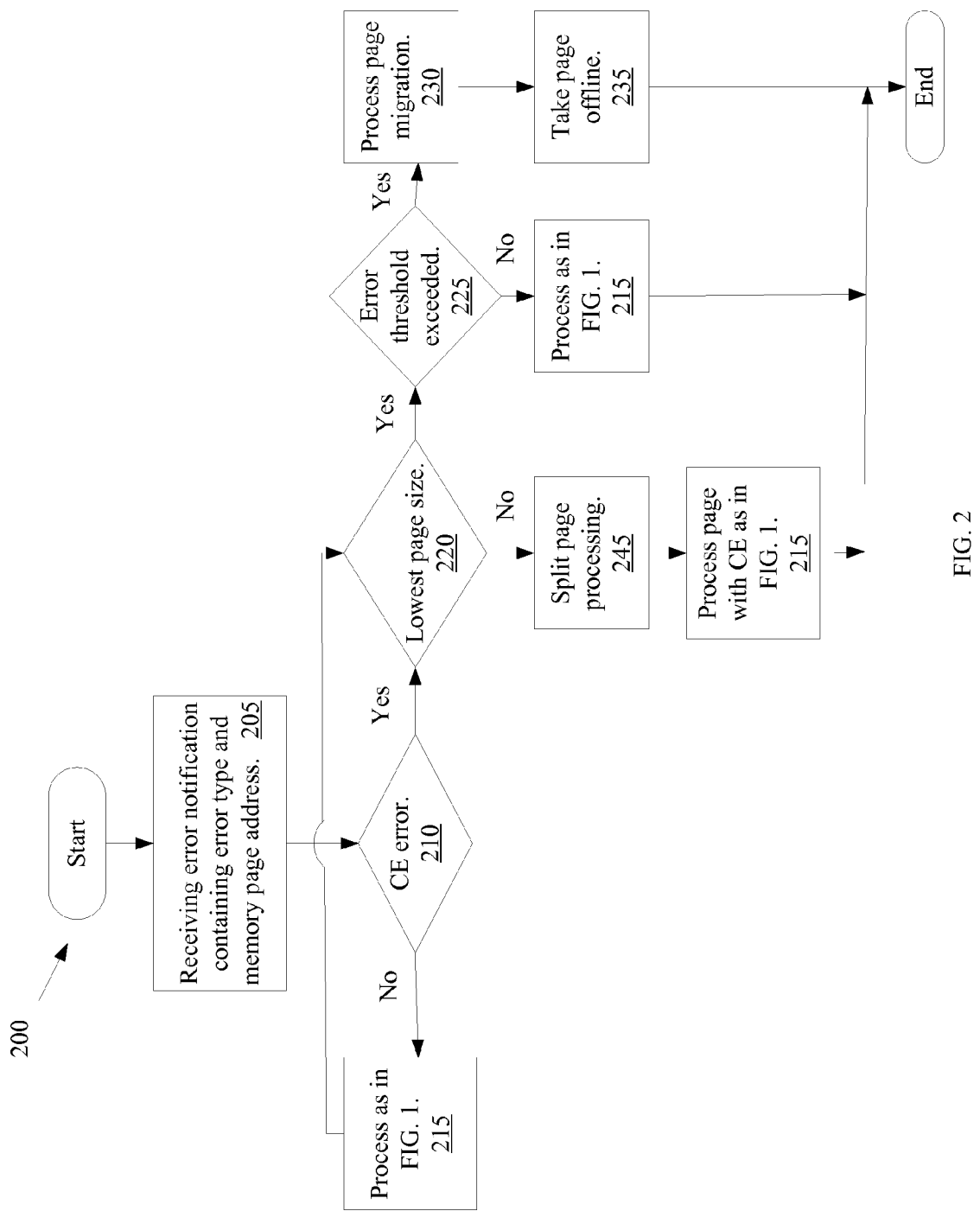
FIG. 2 is a flow chart illustrating a method of recovery from uncorrected memory errors according to another exemplary embodiment.

Now referring to FIG. 2, a method 200 according to another embodiment of the present invention provides a method of recovering from uncorrected memory errors through a technique that may be referred to as page splitting. In some hardware architectures the OS may mark the entire memory page offline upon receiving a notification of a CE. This approach may be chosen in anticipation that further errors may occur, especially UEs which have been statistically shown to occur on memory pages having prior CEs. While this may be a conservative approach, in some example hardware architectures, this may result in the loss of an entire 16 gigabyte (GB) physical page, resulting in an inefficient use of computing resources that may result in diminished system performance.

At 205, the OS receives an interrupt, which may be indicative of receiving an error notification. At 210, the OS, through parameters included in the FLIH, identifies the interrupt event from 205 as a Corrected Error (CE). The OS may then create an entry in its event log with details of the CE that may be used for eventual diagnosis and analysis.

At 220, the OS compares the size of the memory page in error to the minimum memory page size that is supported by the hardware architecture. If the memory page size is larger than the minimum supported memory page size, at 245 the OS may divide the memory page into a plurality of equally-sized new memory pages of the next lowest size that is supported by the OS on the computer hardware architecture. As a result of this process, that portion of the original memory page containing the CE is isolated from the error-free portions of the original memory page. For example, some architectures may support memory page sizes of 16 GB, 16 megabytes (MB), 64 KB, and 4 KB. In the case of a 16 GB memory page, the next lowest supported size is 16 MB. After dividing, the result is 1024 memory pages of 16 MB in size, calculated as:

16 GB/16 MB=1024

Further, if the memory page that encountered the CE can be represented as, for example, the 189$^{th}$ memory page within the new group of 16 MB memory pages, only the 189$^{th}$ memory page will have a CE_ENCOUNTERED status bit set. The remaining 1023 memory pages are recognized as error-free and will remain allocated to the same address space of the program or process as the original memory page prior to splitting. The OS, through its memory management component, assigns physical addresses to the new memory pages and translates those physical addresses to virtual addresses that the program or process can access within its address space.

Upon each execution of process 200, the process of splitting pages to isolate a memory page containing a CE may repeat until the lowest supported page size (e.g., 4 KB) is reached. At each iteration of 220, along with an entry corresponding to the CE in its event log, the OS increments a count of CEs encountered on the memory page. If, at 220, this memory page is at the lowest supported memory page size and cannot be split further, at 225 the OS compares the count of CEs encountered on this memory page to a user-configurable error threshold. If the count exceeds the threshold, then at 230 the OS allocates a replacement memory page that has not previously encountered a CE, as determined by the status of, for example, a CE_ENCOUNTERED bit. The OS copies the contents of the original memory page to the replacement memory page. The page table entries corresponding to the memory pages within the program's address space are updated to remove the address of the original memory page and to add the address of the replacement memory page. The original memory page is added to a queue of memory pages such as, for example, a CE_FREE_PAGES queue, from which the OS may make future memory page allocations. At 235 the OS may deconfigure the memory page by marking the memory page offline. Consequently, when the page splitting technique is applied, only 4 KB out of a 16 GB memory page may be unavailable to the OS for future use.

As shown in FIG. 2 at 215, the effectiveness of the present embodiment may be increased when combined with the embodiment of the present invention described in FIG. 1, although both embodiments may be practiced separately.

Figure 3:
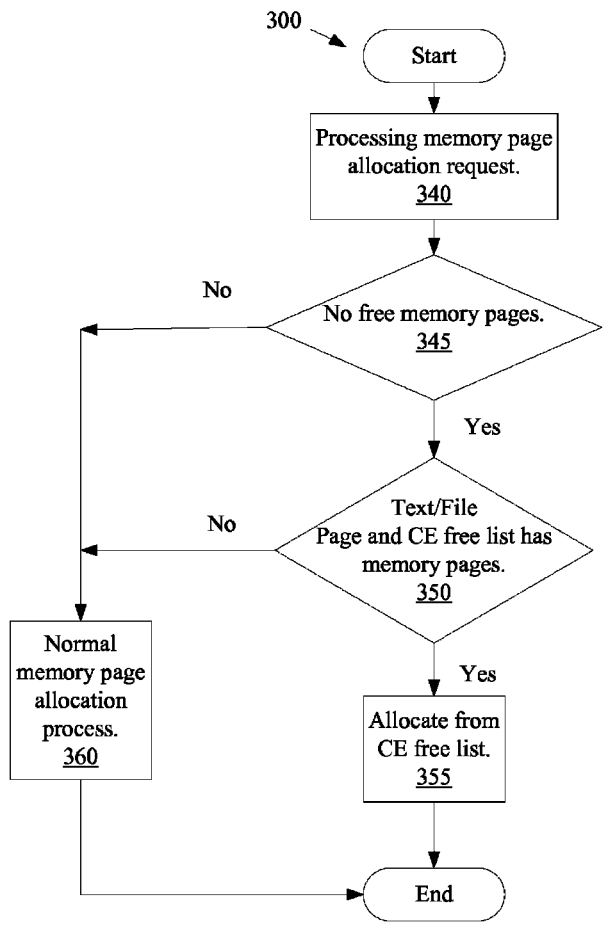
FIG. 3 is a flow chart illustrating a method of processing memory page allocation according to an exemplary embodiment.

Referring to the exemplary process 300 of FIG. 3, at 340, a program or process may request an additional memory page from the OS to continue executing. If, at 345, there are no free memory pages in the OS pool of free memory pages from which the OS may fulfill the memory page allocation, the OS may satisfy the memory page request using an alternate memory page allocation process, such as the OS default memory page allocation process. If at 350, the request is for a file page or text page (i.e., read-only page) and there are free memory pages on the queue of free memory pages that have previously experienced a CE such as from, for example a CE_FREE_PAGES queue, then the memory page request is fulfilled from this pool (355). By allocating a data page or text page from a pool of available (i.e., free) memory pages that have previously experienced a CE, a subsequent UE on one of these memory pages may be less likely to result in hardware failure as a result of the described process (e.g., FIGS. 1 and 2). Additionally, since the contents of data pages and text pages remain static, these page types may be re-fetched from non-transient storage, such as a disk, if needed. If at 345, however, there are no free memory pages in the CE_FREE_PAGES queue, then at 360 the OS may satisfy the request for the additional memory page using an alternate page allocation process, such as the OS default page allocation process.

Figure 4:
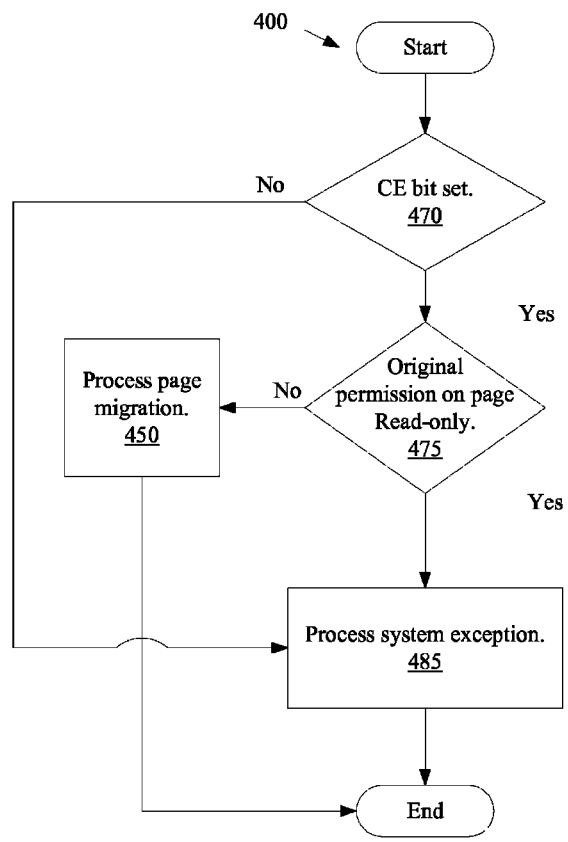
FIG. 4 is a flow chart illustrating a method of processing system exceptions during write operations to memory pages according to an exemplary embodiment.

Referring to FIG. 4, according to one exemplary process 400, the OS may provide components, such as access permissions and keys, to safeguard system integrity, and verify that a program or process is authorized to perform the attempted memory page access. At 470, the OS may query the status bits corresponding to the memory page to verify that the memory page has previously encountered a CE. Where at 470 the memory page has not previously encountered a CE, the OS recognizes an unauthorized attempt by a program or process to write to a memory page. To prevent a potential system integrity problem, the OS may invoke an exception handling procedure at 485. At 470, where the memory page has experienced a CE, if at 475 the original memory page permissions indicate that the memory page is read only, the OS recognizes an unauthorized attempt by a program or process to write to the memory page, and invokes the exception handling procedure at 485. However, where the OS authorizes access to write to the memory page, at 450 the OS allocates a replacement memory page that has not previously encountered a CE, as determined by, for example, the status of a CE_ENCOUNTERED bit. The OS copies the contents of the original memory page to the replacement memory page. The page table entries corresponding to the memory pages within the program's address space are updated to remove the address of the original memory page and to add the address of the replacement memory page. The original memory page is added to a queue of memory pages such as, for example, a CE_FREE_PAGES queue, from which the OS may make future memory page allocations. Thus, an active program or process may continue to access the data on the memory page, since the migration occurred transparently.

Referring now to FIG. 5, computing device 400 may include respective sets of internal component 800 and external components 900. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The firmware 838 and operating system 828 that are associated with computing device 400, can be downloaded to computing device 400 from an external computer (e.g., server) via a network (for example, the Internet, a local area network or other, wide area network) and respective network adapters or interfaces 836. From the network adapters (or switch port adaptors) or interfaces 836, the firmware 838 and operating system 828 associated with computing device 400 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of recovering uncorrected memory errors, the method comprising:
   receiving, at an operating system, a corrected error (CE) associated with a first memory page;
   marking the corrected error in a page table entry describing the first memory page;
   migrating the first memory page, by the operating system, to a second memory page, based on the received corrected error, wherein the second memory page is error-free, wherein the first memory page is a data page, wherein the data page includes program variables that are mapped into memory from a data segment in an executable program file;
   taking no action wherein the first memory page is a text page; and
   flushing the first memory page to a file on non-transient storage, wherein the first memory page is a file page whose contents are mapped into memory from the file that resides on non-transient storage.

2. The method of claim 1, wherein flushing the first memory page further comprises:
   storing a plurality of first access permissions associated with the first memory page in the page table entry describing the first memory page wherein the first memory page is the file page;
   marking the first memory page as having a read-only access permission; and
   writing a contents of the first memory page to the file on non-transient storage, based on a status indicating that the contents of the first memory page are altered.

3. The method of claim 1, wherein migrating the first memory page further comprises:
   copying the contents of the first memory page to the second memory page, wherein the first memory page is the data page and the second memory page is error-free;
   removing an address reference to the first memory page from a plurality of tables describing an address space;
   adding an address reference to the second memory page to the plurality of tables describing the address space; and
   adding the first memory page to an operating system queue of free memory pages having one or more corrected errors.

4. The method of claim 1, further comprising:
   discarding the contents of the first memory page;
   re-fetching, by the operating system, the contents of the first memory page from non-transient storage based on receiving an uncorrected error (UE) associated with the first memory page and based on the first memory page receiving the CE prior to receiving the UE; and
   terminating abnormally, based on the first memory page receiving the UE without receiving the prior CE.

5. The method of claim 1, further comprising:
   allocating a free memory page from the operating system queue of free memory pages having one or more corrected errors, when an operating system queue of error-free pages is empty and a request for allocating the free memory page is for a read-only page wherein the read-only page includes a text page and a file page.

* * * * *